United States Patent [19]

Marino

[11] Patent Number: 4,971,248
[45] Date of Patent: Nov. 20, 1990

[54] AUTOMATIC LAWN TREATMENT DEVICE

[76] Inventor: Frank A. Marino, Rd. #6, Box 806, Branchville, N.J. 07826

[21] Appl. No.: 360,149

[22] Filed: Jun. 1, 1989

[51] Int. Cl.⁵ ............................................. A01G 25/06
[52] U.S. Cl. ........................................ 239/63; 239/318
[58] Field of Search .................... 239/63, 65, 74, 10, 239/310, 318, 200; 137/434, 444

[56] References Cited

U.S. PATENT DOCUMENTS

| | | | |
|---|---|---|---|
| 2,509,627 | 5/1950 | Bickerton et al. | 239/74 X |
| 2,622,928 | 12/1952 | Misch | 239/310 X |
| 3,083,916 | 4/1963 | Neel | 239/315 |
| 3,096,783 | 7/1963 | Dale | 137/434 |
| 3,132,806 | 5/1964 | McNair et al. | 239/318 |
| 3,180,580 | 4/1965 | Schedel | 239/318 |
| 3,331,387 | 7/1967 | Walters | 137/444 X |
| 3,876,146 | 4/1975 | Pacheco | 239/145 |
| 3,937,399 | 2/1976 | Halley | 239/1 |
| 4,026,673 | 5/1977 | Russo | 239/310 X |
| 4,156,396 | 5/1979 | Konucik | 111/7.1 |
| 4,340,179 | 7/1982 | Knapp | 239/310 |

FOREIGN PATENT DOCUMENTS 29 of 1887 United Kingdom ................... 239/74

Primary Examiner—Andres Kashnikow
Assistant Examiner—Kevin Weldon
Attorney, Agent, or Firm—Jerry T. Kearns

[57] ABSTRACT

An automatic lawn treatment device includes a reservoir connected to a rotary type sprinkler for distributing a lawn treatment chemical at a controlled rate. A siphon nozzle in the reservoir mixes a liquid lawn treatment chemical with water from a supply source prior to distribution through the sprinkler. A graduated scale on the reservoir is provided for allowing a carefully measured amount of a treatment chemical to be distributed. A float actuated valve may be provided in the reservoir for shutting off the water flow after a predetermined quantity of chemical has been dispensed.

2 Claims, 3 Drawing Sheets

AUTOMATIC LAWN TREATMENT DEVICE

BACKGROUND OF THE INVENTION

1. Field of the Invention

The present invention relates to automatic lawn treatment devices, and more particularly pertains to a device for mixing a lawn treatment chemical with irrigation water at a controlled rate and distributing the treated water through a sprinkler head. Various types of liquid chemicals such as fertilizers and weed killers are available for treating lawns. These chemicals are conventionally distributed through hand-held sprayers which require constant manual attention. In order to overcome this problem, the present invention provide an automatic device for dispensing a predetermined quantity of a lawn treatment chemical at a controlled rate through a rotating sprinkler.

2. Description of the Prior Art

Various types of lawn treatment devices are known in the prior art. A typical example of such a device is to be found in U.S. Pat. No. 3,083,916, which issued to H. Neel on Apr. 2, 1963. This patent discloses a cylindrical cartridge for attachment on an end portion of a garden hose. The cartridge has a hollow body portion which receives solid cylindrical blocks of a lawn treatment chemical. U.S. Pat. No. 3,876,146, which issued to M. Pacheco on Apr. 8, 1975, discloses an automatic plant waterer and fertilizing system including a reservoir connected by a plurality of capillary feed lines to spaced individual plants. U.S. Pat. No. 3,937,399, which issued to J. Halley on Feb. 10, 1976, discloses a device for feeding a quantity of a solid chemical into a stream of liquid by directing a jet of liquid onto a solid soluble body containing the chemical. A chamber receives a solid body of chemical compositions which is soluble when exposed to a jet of water or other liquid. The device includes an elongated tube mounted at an inclined angle relative to a horizontal surface and provided with liquid inlet and outlets. U.S. Pat. No. 4,156,396, which issued to G. Konucik on May 29, 1979, discloses a root irrigation and fertilization device including a main body having a perforated sleeve adapted for insertion into a ground surface for introducing a controlled amount of water and liquid fertilizer to underground plant roots. U.S. Pat. No. 4,340,179, which issued to P. Knapp on July 20, 1982, discloses a lawn treatment device comprising a cylindrical cartridge adapted for in-line connection in a garden hose. The cartridge comprises a gel with plant nutrient and a water soluble dye suspended therein, with the cartridge having a bore communicating with inlet and outlet connections.

While the above mentioned devices are directed to lawn treatment apparatus for mixing a treatment chemical with irrigation water, none of these devices disclose a reservoir and a sprinkler head combined as an integral unit. Additionally, none of aforesaid devices disclose a reservoir having a siphon nozzle for mixing a liquid lawn treatment chemical with irrigation water from a supply source and including an automatic shut off valve. Inasmuch as the art is relatively crowded with respect to these various types of automatic lawn treatment devices, it can be appreciated that there is a continuing need for and interest in improvements to such automatic lawn treatment devices, and in this respect, the present invention addresses this need and interest.

SUMMARY OF THE INVENTION

In view of the foregoing disadvantages inherent in the known types of automatic lawn treatment devices now present in the prior art, the present invention provides an improved automatic lawn treatment device. As such, the general purpose of the present invention, which will be described subsequently in greater detail, is to provide a new and improved automatic lawn treatment device which has all the advantages of the prior art automatic lawn treatment devices and none of the disadvantages.

To attain this, representative embodiments of the concepts of the present invention are illustrated in the drawings and make use of an automatic lawn treatment device including a reservoir connected to a rotary type sprinkler for distributing a lawn treatment chemical at a controlled rate. A siphon nozzle in the reservoir mixes a liquid lawn treatment chemical with water from a supply source prior to distribution through the sprinkler. A graduated scale on the reservoir is provided for allowing a carefully measured amount of a treatment chemical to be distributed. A float actuated valve may be provided in the reservoir for shutting off the water flow after a predetermined quantity of chemical has been dispensed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automatic lawn treatment device which has all the advantages of the prior art automatic lawn treatment devices and none of the disadvantages.

It is another object of the present invention to provide a new and improved automatic lawn treatment device which may be easily and efficiently manufactured and marketed.

It is a further object of the present invention to provide a new and improved automatic lawn treatment device which is of a durable and reliable construction.

An even further object of the present invention is to provide a new and improved automatic lawn treatment device which is susceptible of a low cost of manufacture with regard to both materials and labor, and which accordingly is then susceptible of low prices of sale to the consuming public, thereby making such automatic lawn treatment devices economically available to the buying public.

Still yet another object of the present invention is to provide a new and improved automatic lawn treatment device which provides in the apparatuses and methods of the prior art some of the advantages thereof, while simultaneously overcoming some of the disadvantages normally associated therewith.

Still another object of the present invention is to provide a new and improved automatic lawn treatment device for mixing and distributing a lawn treatment chemical with irrigation water from a supply source without requiring manual monitoring or manipulation.

Yet another object of the present invention is to provide a new and improved automatic lawn treatment device having a reservoir with a graduated volumetric scale and a siphon nozzle for mixing a carefully measured quantity of a lawn treatment chemical at a controlled rate with irrigation water from a supply source.

Even still another object of the present invention is to provide a new and improved automatic lawn treatment device including a valve mechanism for shutting off water flow after a predetermined quantity of a treatment chemical has been distributed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
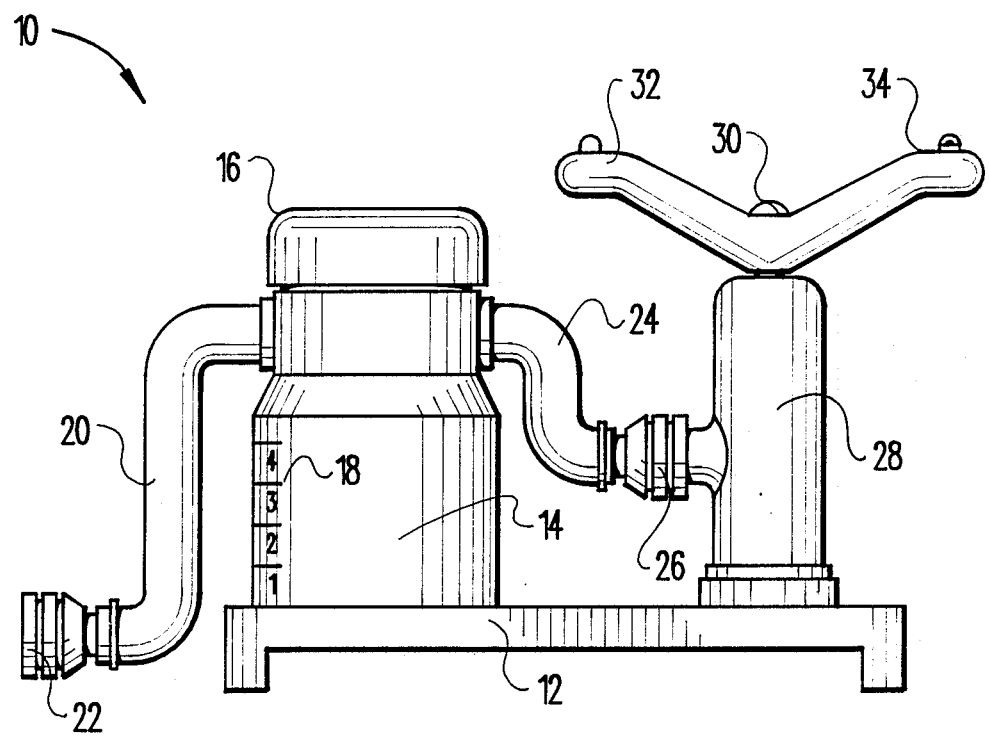
FIG. 1 is an elevational view illustrating the automatic lawn treatment device of the present invention.

With reference now to the drawings, and in particular to FIG. 1 thereof, a new and improved automatic lawn treatment device embodying the principles and concepts of the present invention and generally designated by the reference numeral 10 will be described.

More specifically, it will be noted that the first embodiment 10 of the invention includes a base 12 having a generally cylindrical reservoir 14 secured thereon. A removable cap 16 is provided on an open top portion of the reservoir 14 and allows a liquid lawn treatment chemical such as fertilizer or weed killer to be added thereto. The reservoir 14 is preferably formed from a transparent glass or plastic material and is provided with a graduated volumetric scale 18 for careful measurement of a quantity of lawn treatment chemical to be dispensed. An inlet conduit 20 has a conventional coupling 22 for attachment to a conventional garden hose.

An outlet conduit 24 is connected by a coupling 26 to a sprinkler head body portion 28 having a pair of rotating spray head portions 32 and 34. A removable plug 30 is secured at a vertex of the spray head arms 32 and 34 for assembly purposes.

Figure 2:
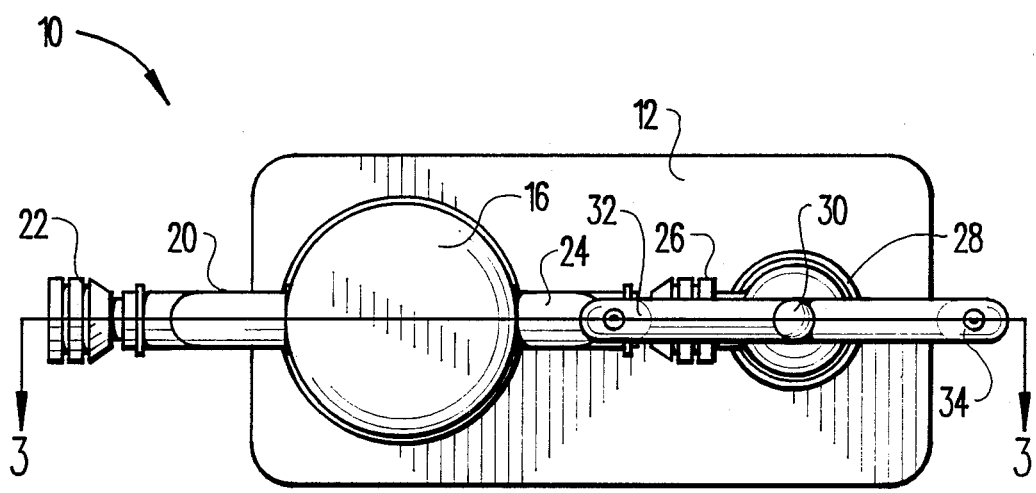
FIG. 2 is a top plan view of the treatment device of FIG. 1.

FIG. 2 is a top plan view further illustrating the construction of the automatic lawn treatment device of FIG. 1.

Figure 3:
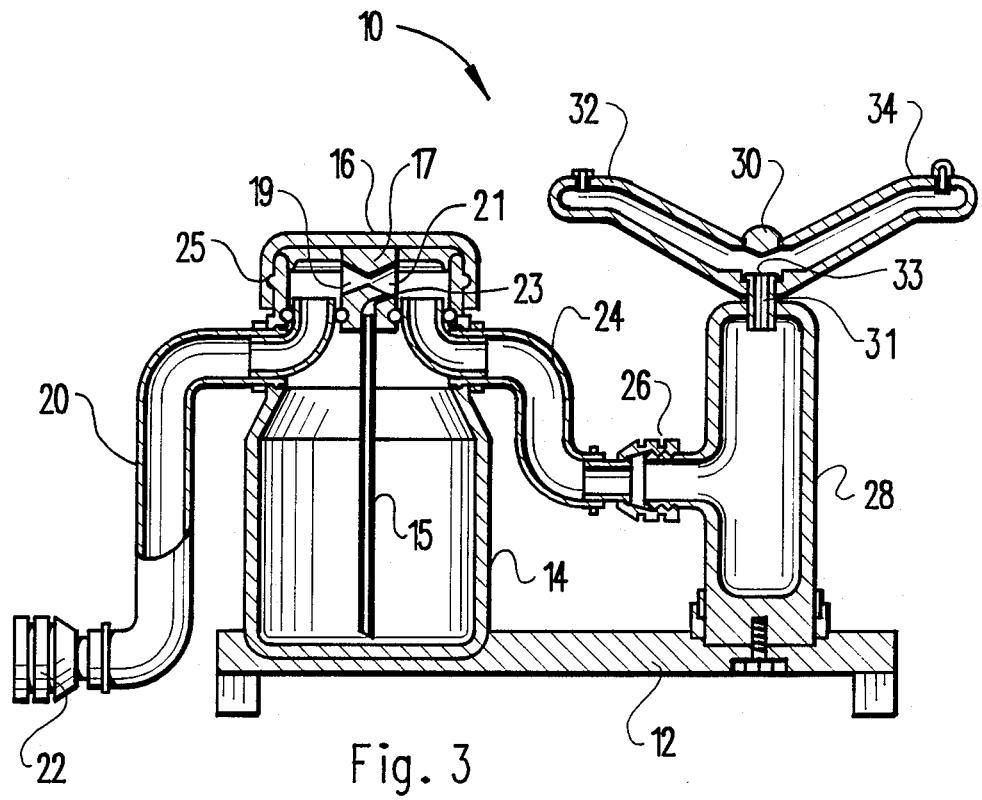
FIG. 3 is a longitudinal cross sectional view, taken along line 3—3 of FIG. 2.

As illustrated in the longitudinal cross sectional view of FIG. 3, the reservoir 14 is a generally cylindrical container having an open top portion on which a removable cap 16 is secured. The cap 16 is preferably provided with a cooperating circumferential groove and circumferential ridge connection 25 at the neck portion of the reservoir 14. A siphon nozzle body 17 has a passage formed by diverging oppositely directed frusto conical portions 19 and 21. A passage 23 connects tangentially with a downstream end 21 of the siphon nozzle passage and is connected to a siphon tube 15 having a lower end terminating slightly above the interior floor of the reservoir 14. In use, water from a supply source enters through the conduit 20 and passes through the inlet portion 19 of the siphon nozzle passage and exits through the outlet portion 21 of the siphon nozzle passage. These diverging frusto conical portions 19 and 21 create a choked fluid flow pattern causing a low pressure to be created adjacent the intersection of the passage 23 with the outlet portion 21, causing a liquid lawn treatment chemical within the reservoir 14 to be siphoned through the tube 15 and mixed into the water stream. The treated water then passes through the outlet conduit 24, through the coupling 26 and into the sprinkler body portion 28. A tubular sleeve 31 has a radial flange 33 which constrains the rotating spray arms 32 and 34. The removable plug 30 facilitates assembly of the sprinkler components.

Figure 4:
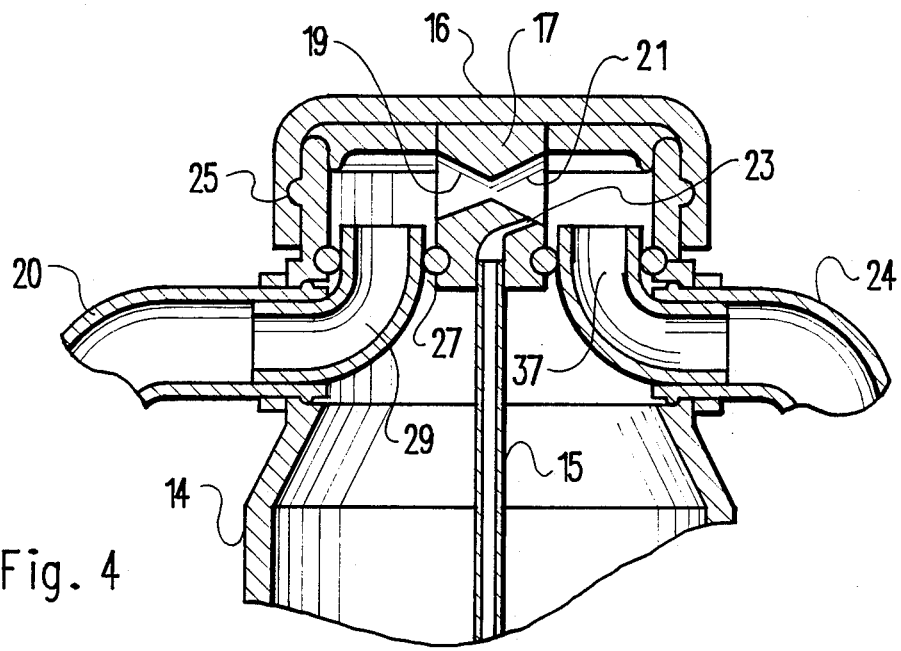
FIG. 4 is a longitudinal enlarged cross sectional detail view illustrating the construction of the reservoir siphon nozzle.

FIG. 4 is an enlarged cross sectional view detail view which further illustrates the construction of the reservoir siphon nozzle. The main body portion of the reservoir 14 is substantially separated from the distal end portions of the inlet conduits 29 and outlet conduit 37 by a sealing plate 27. Suitable 0-ring seals are provided for sealing the conduit ends 29 and 37 within circular apertures formed through the disk-shaped plate 27. The plate 27 is connected with the siphon nozzle body 17 such that upon removal of the cap 16, the nozzle body 17, plate 27 and tube 15 are removed as a unit. A suitable air vent aperture may of course be provided for equalizing pressure within the reservoir body 14 as the liquid treatment chemical is dispensed therefrom.

Figure 5:
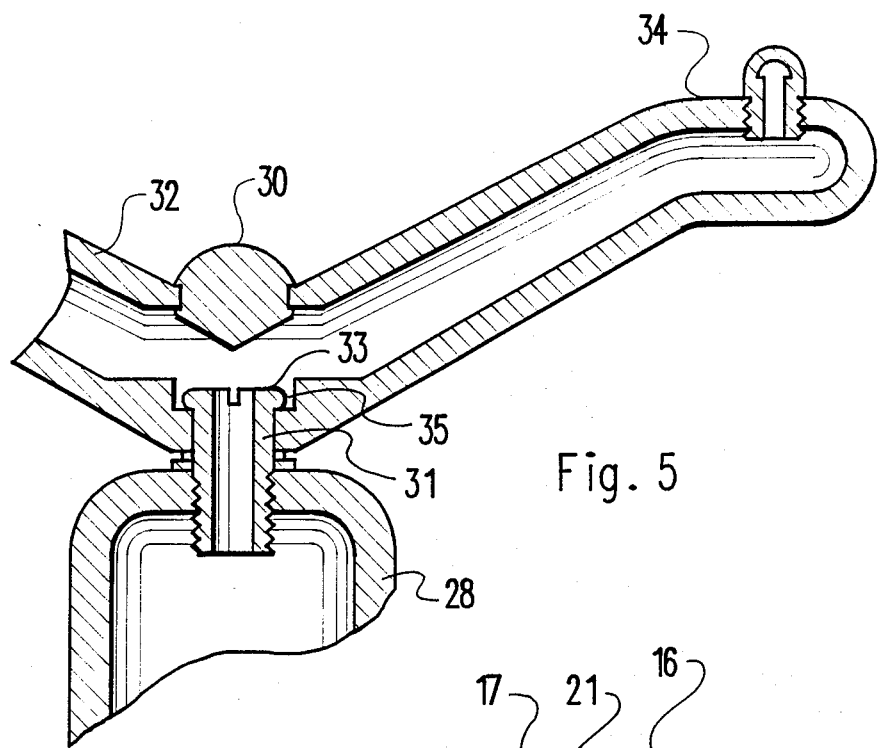
FIG. 5 is a cross sectional detail view illustrating the construction of the rotary sprinkler head.

FIG. 5 is an enlarged detail view which illustrates the tubular sleeve 31 having an enlarged radial flange 33 received within a counter sunk portion 35 on the vertex portion of the rotary sprinkler head. This forms a rotary bearing for the sprinkler arms 32 and 34.

Figure 6:
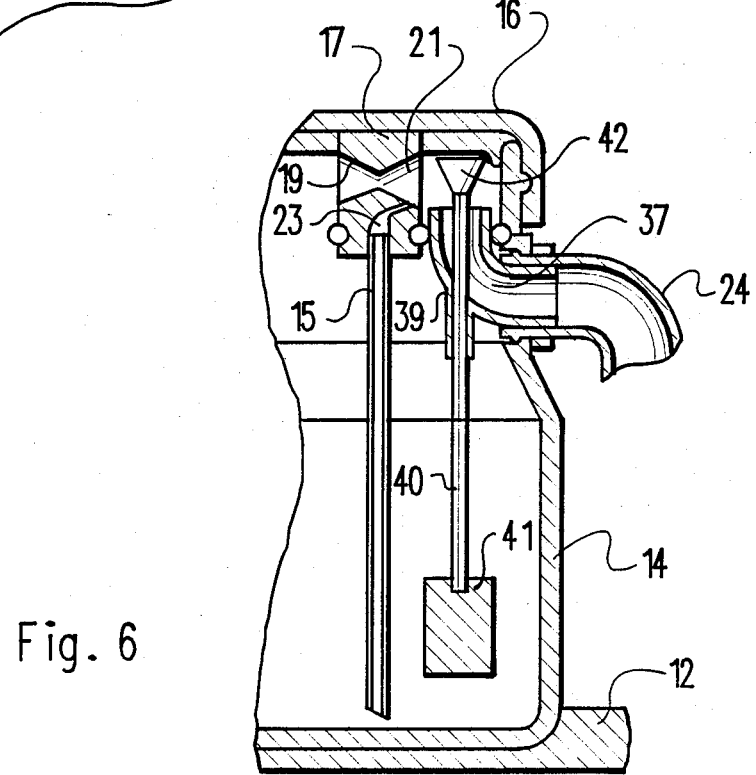
FIG. 6 is a longitudinal partial cross sectional detail view illustrating an optional float valve arrangement for shutting off water flow after a predetermined quantity of a lawn treatment chemical has been dispensed.

FIG. 6 is an enlarged detail view which illustrates an optional float valve mechanism for shutting off the water supply to the sprinkler head after a predetermined quantity of a lawn treatment chemical has been dispensed. This valving arrangement includes a tubular guide sleeve 39 connected to the distal end portion 37 of the outlet conduit which slidably receives the stem 40 of a frusto conical valve 42. A float 41 at the lower end of the stem 40 opens the valve 42 when a lawn treatment chemical is added to the reservoir 14. When the lawn treatment chemical has been completely dispensed, the float 41 will be allowed to move downwardly, thus closing the valve 42 over the distal end portion of the outlet conduit 37, thus shutting off the water supply to the sprinkler head. This will alert an individual that the treatment has been completed and avoiding overwatering which may reduce the effectiveness of the treatment.

It may now be understood that the present invention provides a substantially automatic system for conveniently dispensing a predetermined quantity of a liquid lawn treatment chemical at a controlled rate.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An automatic lawn treatment device, comprising:
a base;
sprinkling means on said base;
a generally cylindrical container on said base, said cylindrical container having an open top portion and a hollow body portion for receiving a predetermined quantity of a lawn treatment chemical;
a removable cap received in sealing engagement on said open top portion of said container;
an inlet conduit connected to said cylindrical container for connection with a water supply source;
an outlet conduit connected between said cylindrical container and said sprinkling means;
a siphon nozzle body extending downwardly from a central interior location on an inner surface of said cap;
a first passage having diverging oppositely directed frusto conical portions formed through said siphon nozzle body;
a cylindrical sealing plate secured in surrounding relation to said siphon nozzle body, said sealing plate dimensioned for sealing engagement with an interior sidewall of said cylindrical container;
a pair of apertures formed through said sealing plate, said apertures removably receiving end portions of said inlet and outlet conduits, said sealing plate substantially sealing said inlet and outlet conduits from said hollow body portion of said container such that said inlet and outlet conduits are connected to opposite ends of said first passage;
a second passage in said siphon valve body communicating tangentially with a downstream side of said first passage;
a tube in fluid communication between said hollow body portion of said container and said second passage;
a frusto conical float actuated valve disposed for closing said outlet conduit upon distribution of a predetermined quantity of a liquid lawn treatment chemical from said cylindrical container and for allowing mixing of a liquid lawn treatment chemical at a controlled rate with water from a water supply source connected to said inlet conduit for distribution by said sprinkling means;
a tubular guide sleeve connected to an arcuate portion of said outlet conduit;
an elongated stem received for axial sliding movement in said guide sleeve, said stem extending partially within said outlet conduit through a sidewall of said arcuate portion;
a float secured to a lower end of said stem disposed within said hollow body portion of said container; and
said frusto conical valve secured to an upper end of said stem such that downward movement of said float upon depletion of a predetermined quantity of lawn treatment chemical in said hollow body portion of said cylindrical container will result in engagement of said frusto conical valve with said outlet conduit, preventing further flow of water to said sprinkling means.

2. The automatic lawn treatment device of claim 1, wherein said cylindrical container is transparent and includes a graduated volumetric scale.

* * * * *